United States Patent [19]

McGoon et al.

[11] Patent Number: 5,411,434

[45] Date of Patent: May 2, 1995

[54] POULTRY SHOULDER AND BREAST SEVERING MACHINE

[75] Inventors: David B. McGoon, Springfield; Charles R. Kirby, Sweet Springs, both of Mo.

[73] Assignee: Kays Engineering, Marshall, Mo.

[21] Appl. No.: 856,632

[22] Filed: Mar. 24, 1992

[51] Int. Cl.⁶ ............................................. A22C 21/00
[52] U.S. Cl. ................................... 452/166; 452/165; 452/169; 452/151
[58] Field of Search ............... 452/166, 165, 169, 163, 452/151, 154

[56] References Cited

U.S. PATENT DOCUMENTS

| | | | |
|---|---|---|---|
| 4,503,587 | 3/1985 | Martin | 452/169 |
| 4,562,613 | 1/1986 | Lewis | 452/169 |
| 4,873,746 | 10/1989 | Scheier et al. | 452/169 |
| 5,083,974 | 1/1992 | Martin et al. | 452/169 |
| 5,183,434 | 2/1993 | Scheier et al. | 452/169 |

Primary Examiner—Willis Little
Attorney, Agent, or Firm—Hovey, Williams, Timmons & Collins

[57] ABSTRACT

Poultry processing apparatus is disclosed for automatically performing shoulder-wing separation and severing cuts, short transverse shoulder cuts and long back cuts in the rib cage breast meat of a poultry carcass preparatory to removal of the wings and breast meat from the carcass. The apparatus includes a conveyor having a series of carcass support cones sequentially moveable along a predetermined path of travel. Combination shoulder-wing joint locating and separating members cooperate with C-shaped cutters pivotally thereon to define scissors mechanism located at a fixed position along the conveyor path to displace each wing bone from its respective shoulder socket and to then sever respective connective shoulder muscle and tendons while at the same time performing the short shoulder cuts in the carcass breast meat. Rotary blade means pivotally mounted at a second position along the conveyor path function to form the long back cut incisions in the breast meat while following along shoulder socket supporting bones projecting from the bird's rib cage without severing such bones.

18 Claims, 7 Drawing Sheets

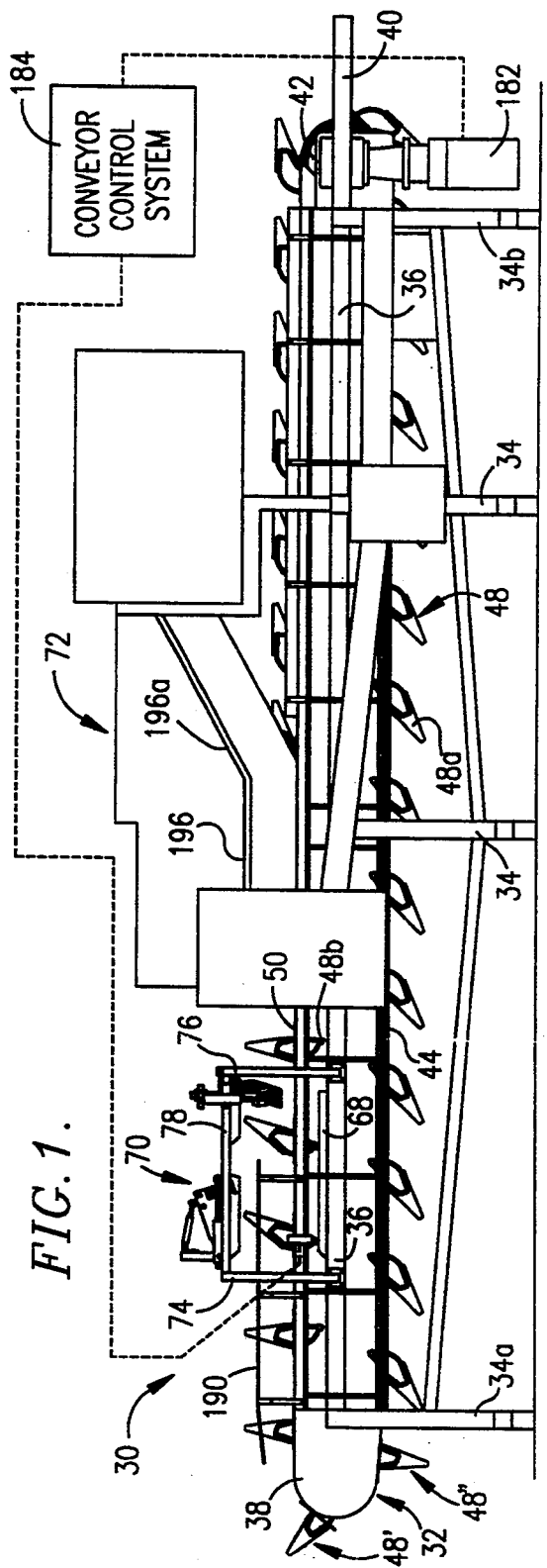
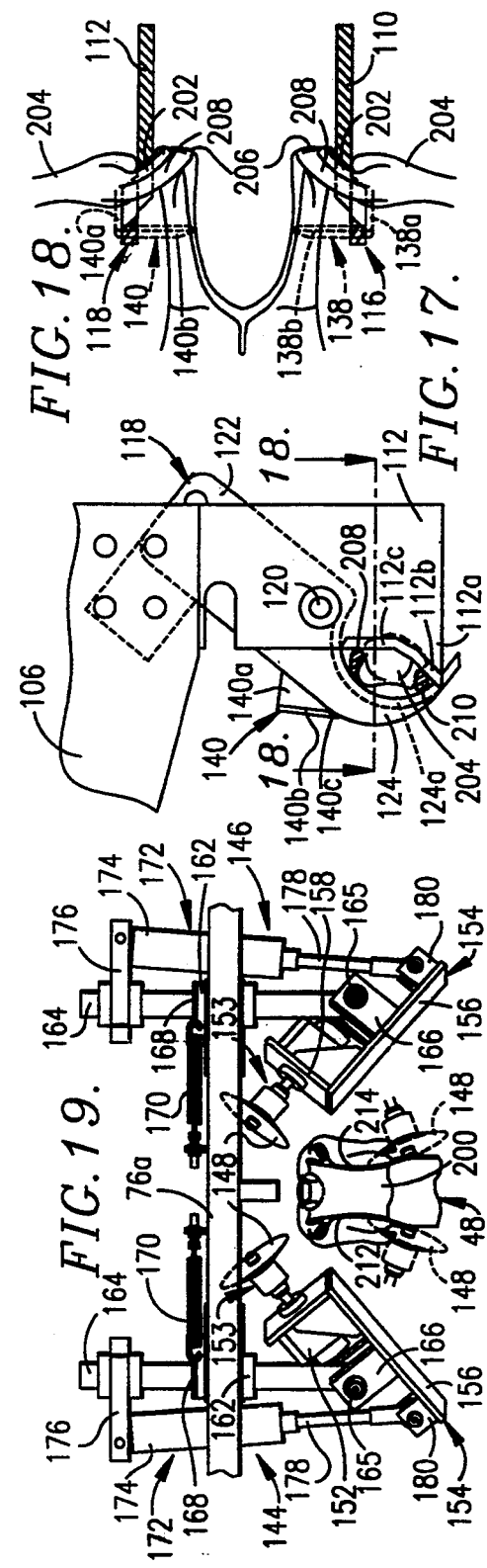

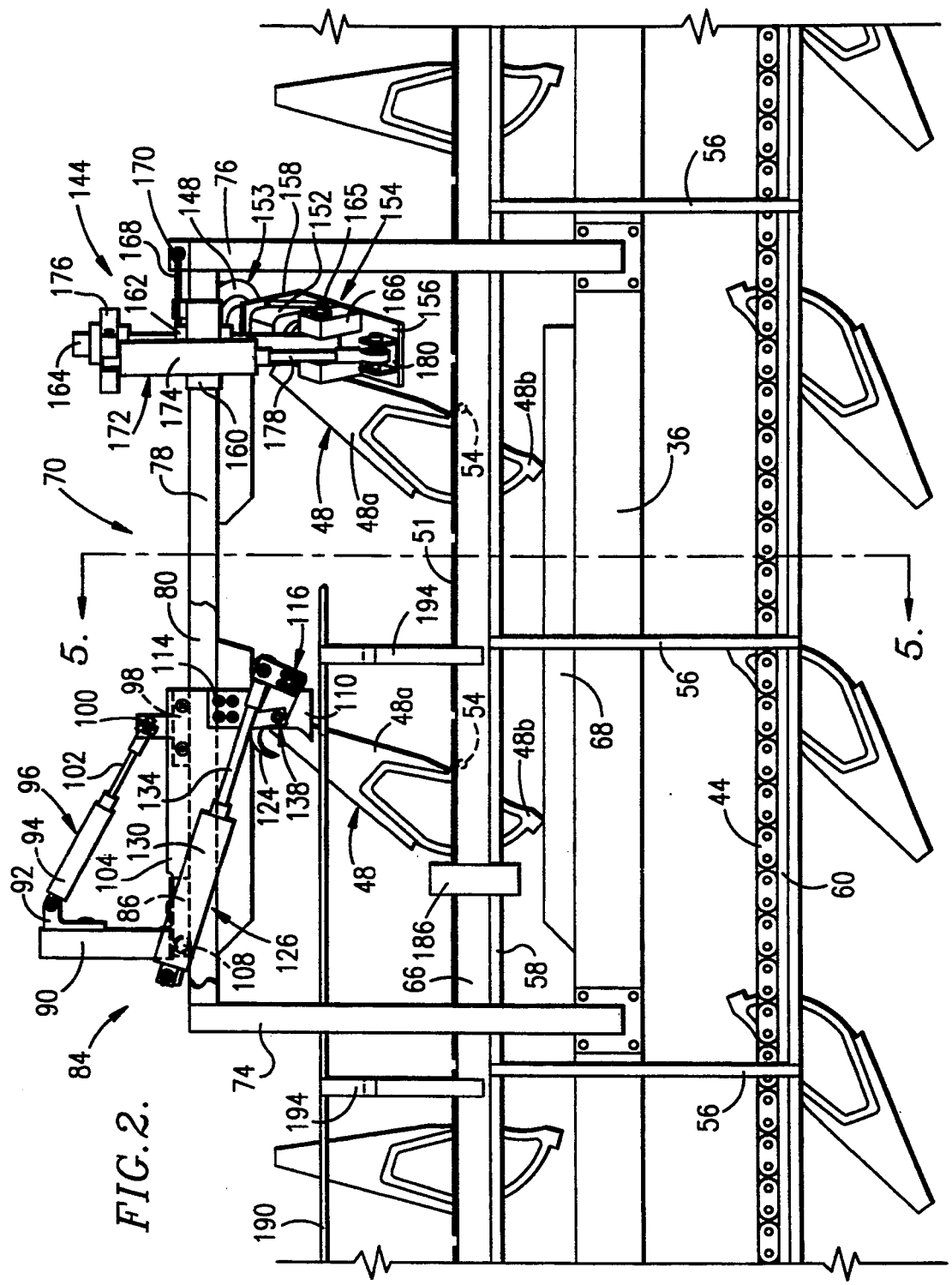

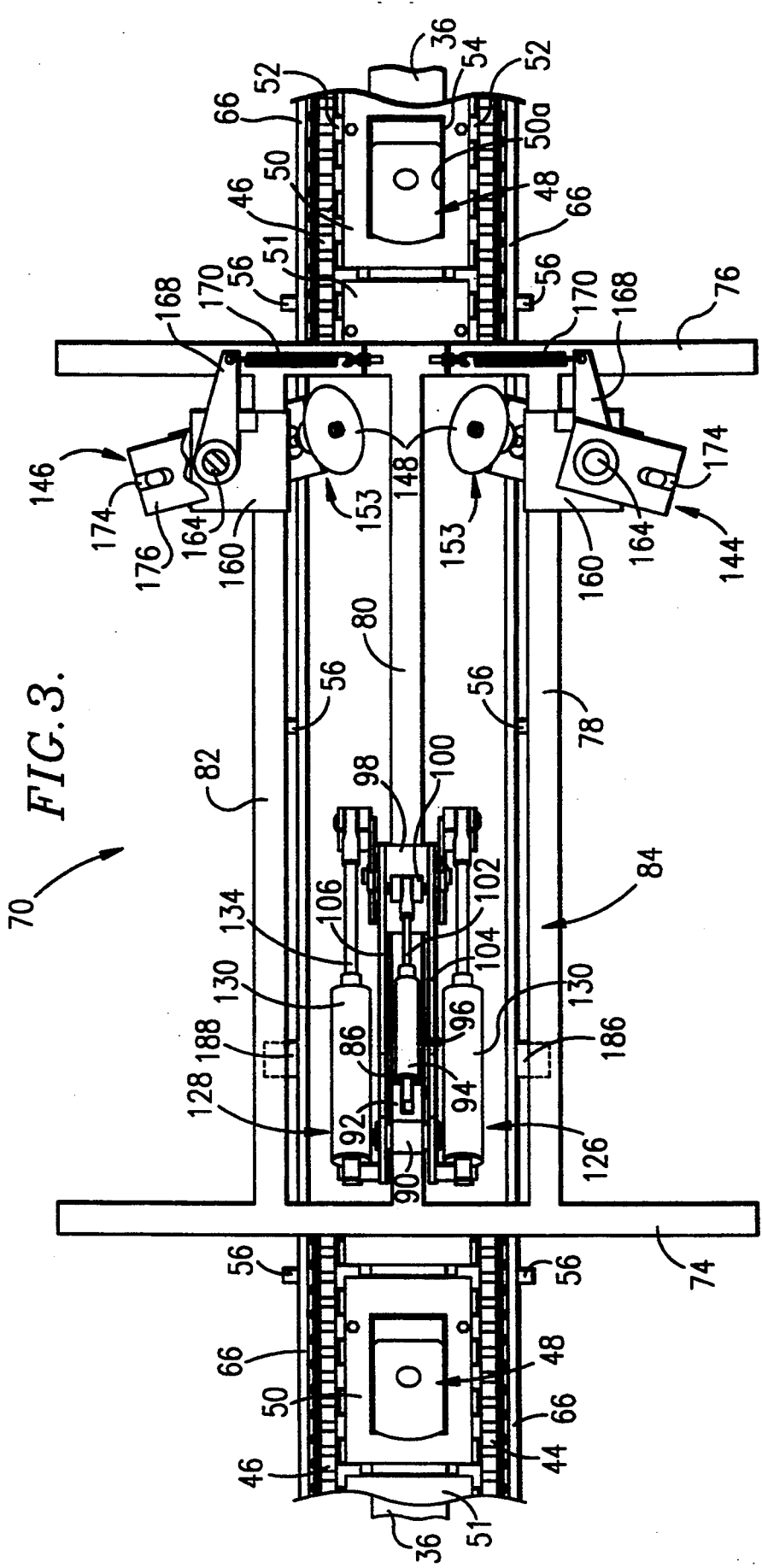

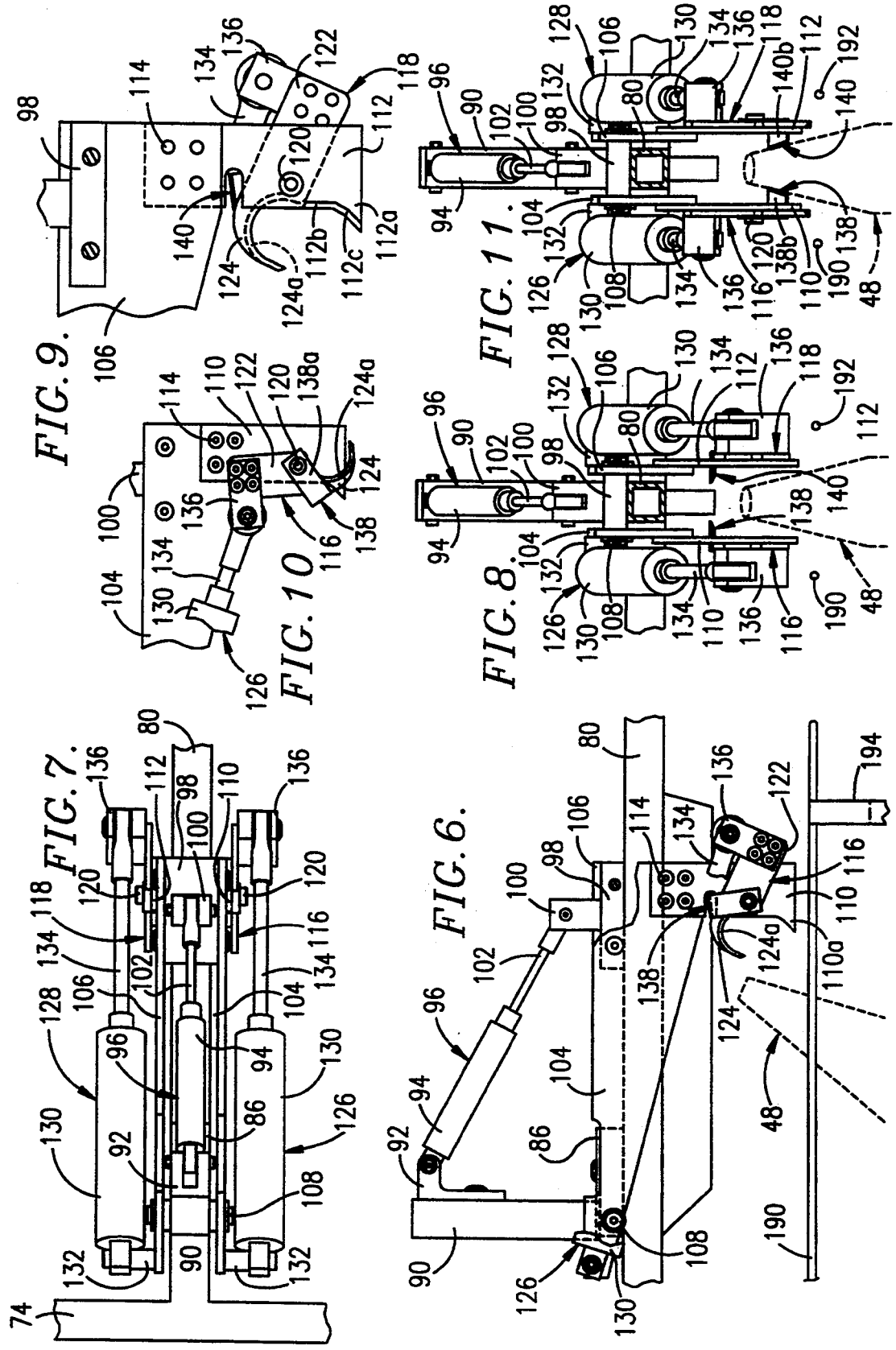

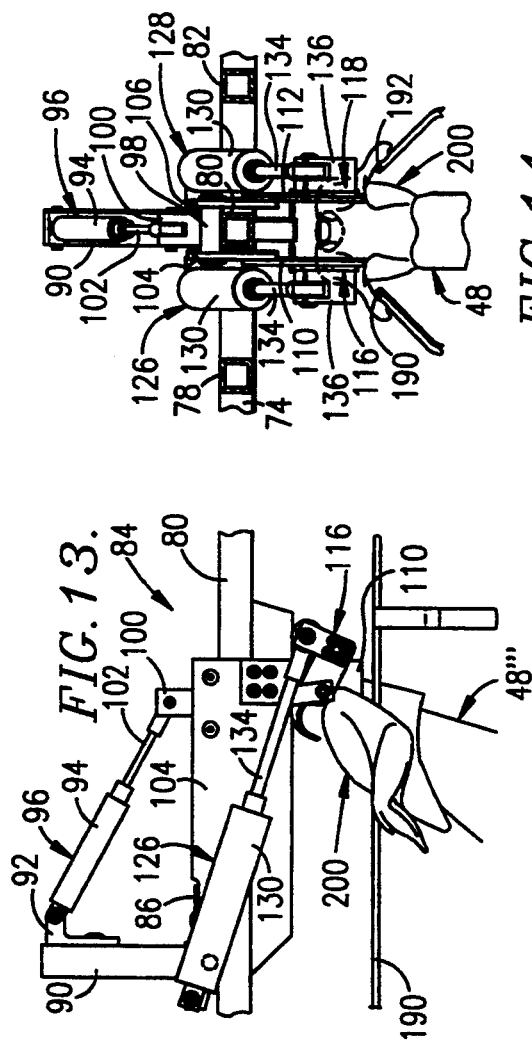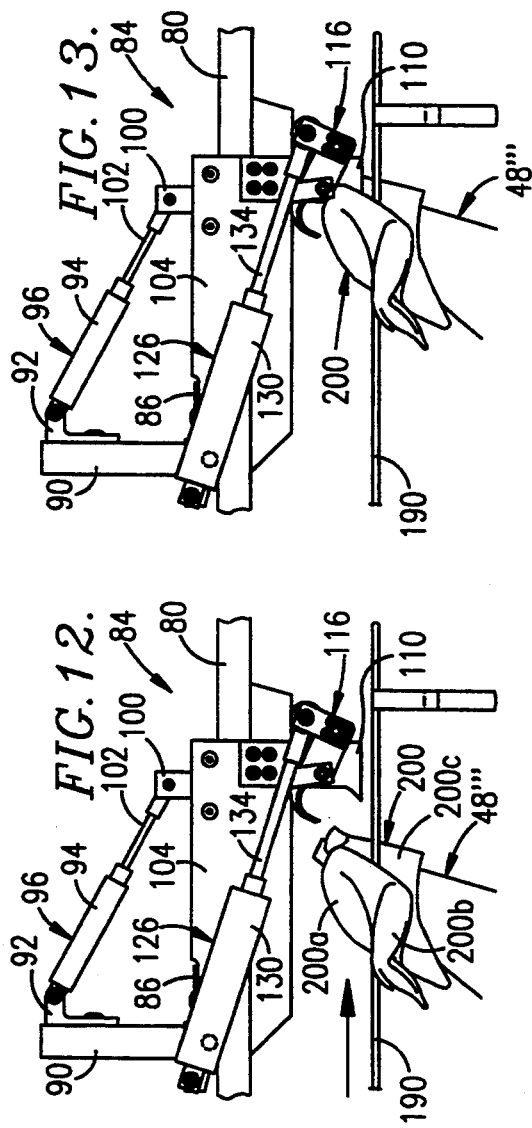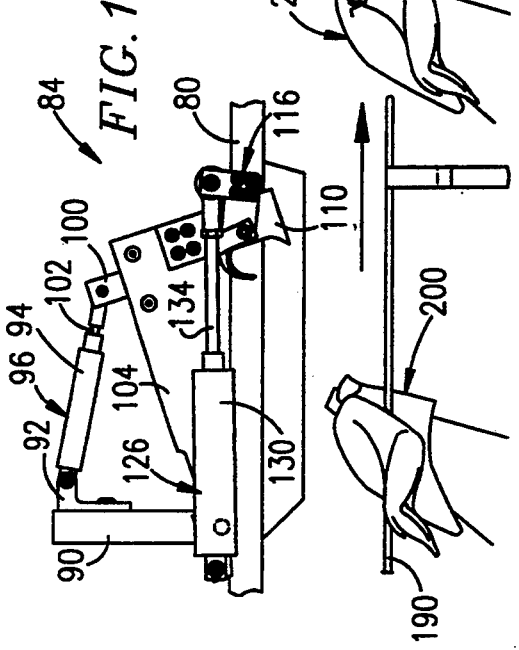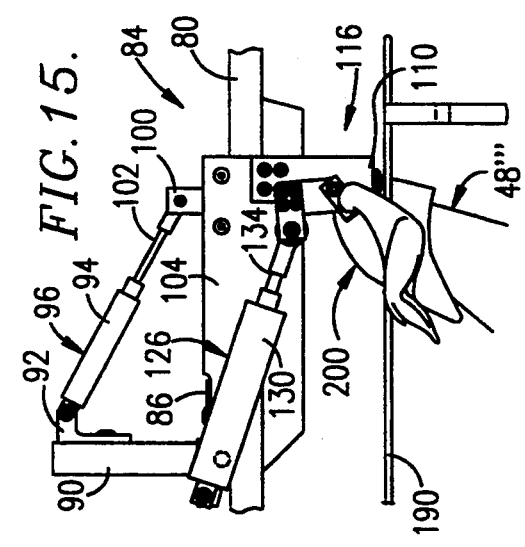

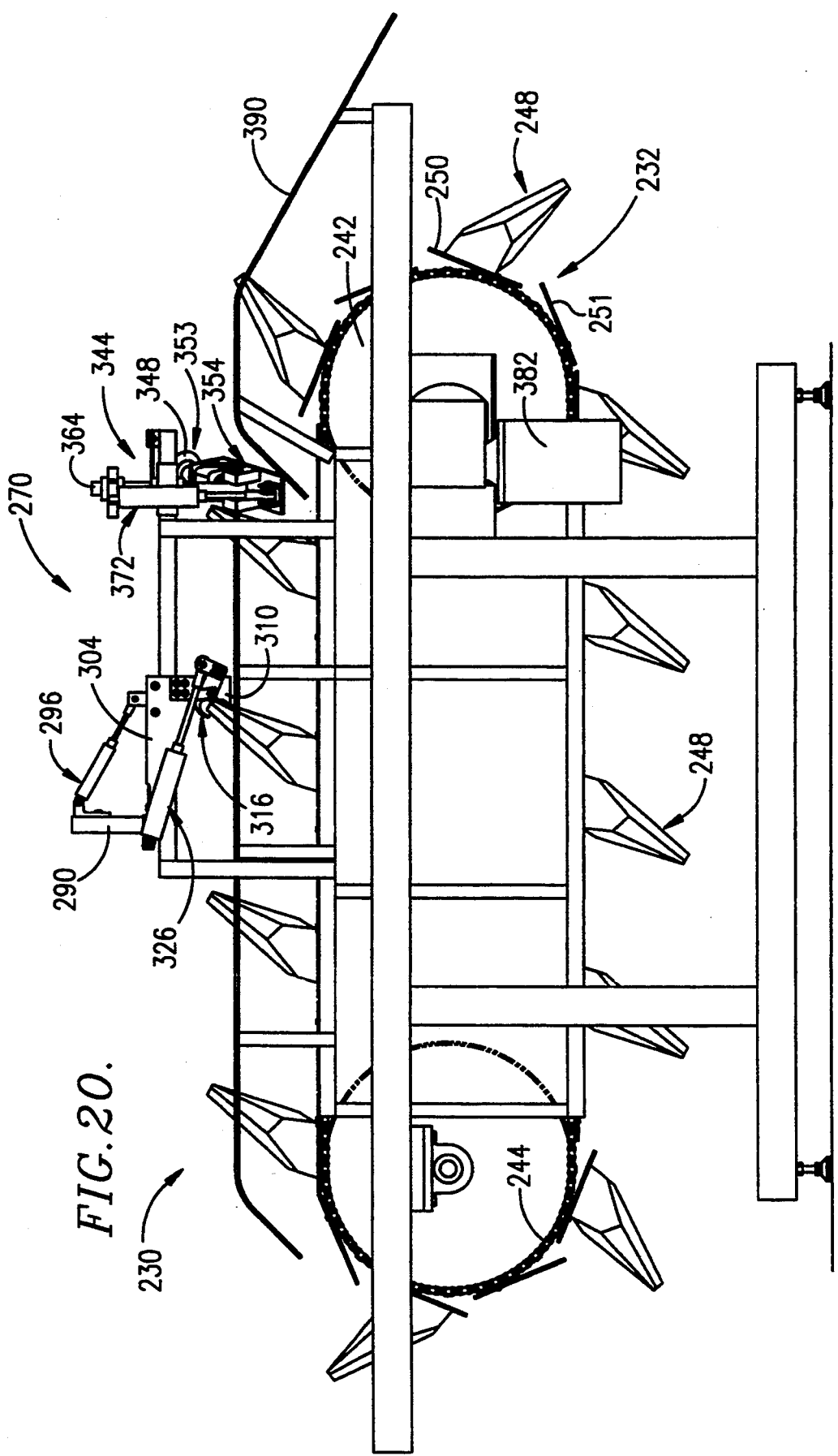

POULTRY SHOULDER AND BREAST SEVERING MACHINE

BACKGROUND OF THE INVENTION

1. Field of the Invention

This invention relates to poultry processing equipment and especially to apparatus for automatically separating the shoulder-wing joints and for severing connective shoulder muscle and tendons of a poultry carcass being processed and for forming elongated incisions on opposite sides of the back part of the breast meat on the bird rib cage to facilitate subsequent removal of the wings and breast meat from the carcass.

2. Description of the Prior Art

Processing of poultry has become increasingly automated as the need to enhance productivity and reduce processing costs has escalated. One effective means to reduce expenses is to replace personnel performing manual operations with automatic machinery.

However, machines have not been capable of carrying out certain processing steps because of the inability of the equipment to accommodate poultry carcasses which somewhat vary in size from bird to bird, and the specialized nature of particular pre-cut operations that must be performed. Exemplary in this respect is the need to prepare the carcasses for efficient machine removal of the wings and breast meat from the carcass rib cage.

Equipment is available and has been in use for some years which functions to grasp the wings and the breast portions of the carcass and to then sever the wings and/or pull the breast meat from the bird's rib cage. Machines of this type are generally known as deboners. Wing removal has been performed primarily by causing partially severed wings to be trapped in wing receiving slots that are at an angle with respect to the path of travel of the carcass along a predetermined conveyor path. As the birds are moved along the path, the wings are deflected into the inclined slots and are ultimately severed from the carcass. In like manner, equipment has been provided which has components for grasping the breast meat and to then pull such meat from the carcass rib cage.

In order for the wing and breast removal equipment to operate most satisfactorily, it has been the practice to station personnel on each side of the conveyor path who have the responsibility of wielding hand knives to cut through the connective muscle and tendons of the shoulder-wing joints of the carcasses, to then carry the blade of the knife down across the back portion of the breast meat to form long incisions which follow along respective shoulder joint supporting bones extending from the bird's rib cage, and to form transverse short cuts adjacent the shoulder joints of the carcasses to facilitate subsequent grasping of the meat by the breast removal equipment.

It is therefore an important object of this invention to provide apparatus which will automatically perform the shoulder-wing separation and severing cuts, short transverse shoulder cuts and long back cut incisions in the rib cage breast meat of a poultry carcass that have heretofore been accomplished only on a manual basis.

SUMMARY OF THE INVENTION

The poultry processing apparatus of this invention includes a conveyor supporting a series of carcass supporting cones moveable along a horizontal path of travel. Each of the cones is adapted to support the rib cage and wing portion of a bird in an upright position so that precise cuts may automatically be made in the shoulder-wing joints of the carcass and along the back portion of the breast meat, preparatory to removal of the wings and breast from each bird.

Structure for making the required shoulder-wing joint cuts, short shoulder cuts and long back breast incisions in each carcass includes shoulder-wing joint locating and separating members on opposite sides of the conveyor at a first position along the conveyor path. Each of the members is cooperable with a C-shaped cutter element pivotally mounted on the member to define scissors mechanism which separates each wing bone from its shoulder receiving socket, and also cuts through connective muscle and tendons of each joint, leaving each of the wings of the carcass attached to the rib cage only by readily severable surrounding cartilage and flesh. A cutter knife is also mounted on each of the C-shaped cutter elements in transversely extending relationship thereto so that as the cutter elements are pivoted to effect separation and severing of the shoulder-wing joint, a short transverse cut is made in the shoulder meat adjacent each joint.

The locating and separating members have beveled leading edge portions strategically positioned to search out and become lodged in the joint defining notch between each wing bone and the shoulder socket. Thus, as an associated C-shaped cutter element is swung through its joint separating and muscle-tendon cutting arc, each locating and separating member enters a respective joint and assures severing of the connective muscle and shoulder tendons without cutting of bone or surrounding cartilage.

Two rotary cutters are mounted on opposite sides of the conveyor path at a second position downstream of the first cutting position to form two long back cut incisions in the breast meat of the carcass. Each cutter includes a rotary blade driven by a motor which is mounted on a platform that is pivotable about both horizontal and vertical axes. Power means is connected to each cutter support platform for pivoting the platform about its horizontal support axis. Each platform is free to pivot about its vertical axis of movement against spring bias.

When each bird is moved into its second position along the conveyor path, motor driven blades are moved downwardly to form incisions in the breast meat of the carcass. By virtue of the freedom of movement of the cutter blade assemblies about a vertical axis, the cutter blades may engage shoulder-wing joint supporting bone structure of the carcass and follow along such bones without cutting through the same. In this manner, elongated, somewhat arcuate incisions may be formed in the back portion of the breast meat of the bird for facilitating subsequent removal of the breast meat in the form of a butterfly filet.

The processing equipment of this invention may be mounted in-line ahead of a conventional deboner such as a wing and breast removal unit, or it may be operated in a processing facility as a separate, stand alone processor.

BRIEF DESCRIPTION OF THE DRAWINGS

FIG. 1 is a side elevational view of poultry processing equipment of this invention illustrated in-line with a deboner unit or the like for removing the wings and breast meat from the rib cage of a poultry carcass;

FIG. 2 is a fragmentary side elevational view of the processing equipment hereof as shown in FIG. 1;

FIG. 3 is a fragmentary plan view of the portion of the processing equipment illustrated in FIG. 2;

FIG. 6 is a fragmentary enlarged side elevational view of the shoulder-wing joint separating and severing structure of the invention;

FIG. 7 is a fragmentary plan view of the structure illustrated in FIG. 6;

FIG. 8 is a fragmentary end elevational view of the structure shown in FIG. 6 and 7;

FIG. 9 is a fragmentary side elevational view from the opposite side of the joint separating and severing structure depicted in FIG. 6;

FIG. 10 is a fragmentary side elevational view of the joint separating and severing structure shown in FIG. 6 and illustrating the pivotal C-shaped cutter element in the position thereof after the same has been moved through a displacement to separate the wing bone from the shoulder joint from a poultry carcass and to sever connective shoulder muscle and tendons of the joint;

FIG. 11 is a view similar to FIG. 10 and illustrating the C-shaped cutter elements in their actuated positions;

FIG. 12 a fragmentary view as depicted in FIG. 6 on a somewhat reduced scale and schematically illustrating a poultry carcass carried by a conveyor cone support as it approaches the first cutting position of the processing equipment;

FIG. 13 is a fragmentary view similar to FIG. 12 and illustrating the poultry carcass in the first cutting position along the conveyor path and depicting the manner in which the locating and separating members of the joint locating and separating means become nested in respective notches defined by the wing bones and shoulder sockets of corresponding shoulder-wing joints;

FIG. 14 is an end view of the first cutting position as shown in FIG. 13, and more clearly showing the manner in which the locating and separating members nest in respective shoulder joints of the carcass;

FIG. 15 is a view of the carcass at the first cutting position along the conveyor path and illustrating the C-shaped cutter elements in the positions thereof after they have moved through a displacement to separate respective wing bones from the shoulder sockets and to sever connective muscle and tendons of corresponding shoulder-wing joints;

FIG. 16 depicts a carcass leaving the first cutting position and illustrating the way in which each severed wing lays down against the rib cage portion of the carcass and remains connected to the breast only by residual cartilage and flesh;

FIG. 17 is a fragmentary, enlarged side elevational view of the cutter mechanism shown in FIG. 6–11 and schematically illustrating the way in which a C-shaped cutter element is cooperable with its associated fixed joint locating and separating member to displace each wing bone from its shoulder joint and at the same time sever connective tendons and shoulder muscle;

FIG. 18 is a fragmentary schematic cross-sectional view taken substantially on the line 18 of FIG. 17 and looking downwardly, and also better illustrating the way in which transverse knives carried by each of the C-shaped cutter elements are functional to make short cross cuts in the shoulder portions of the carcass;

FIG. 19 is a fragmentary end elevational view of the structure shown in FIG. 4 and schematically depicting the way in which the rotary cutters are operable to form long, somewhat arcuate back cut incisions in the breast meat of the bird; land FIG. 20 is a side elevational view of stand alone poultry processing equipment in accordance with a preferred embodiment of the invention.

DETAILED DESCRIPTION OF THE IN-LINE EMBODIMENT OF THE INVENTION

Figure 5:
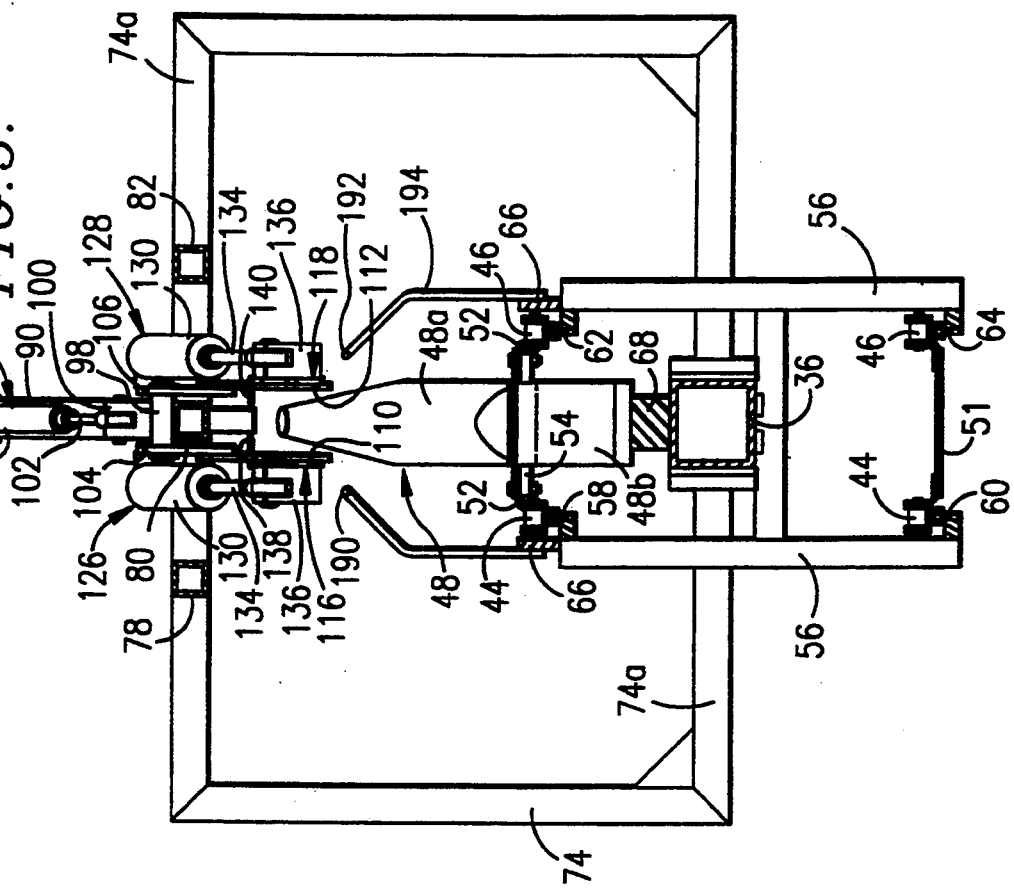
FIG. 5 is a vertical cross-sectional view taken along the line 5—5 of FIG. 2 and looking in the direction of the arrows.

Poultry processing apparatus 30 illustrated in FIGS. 1–19 typically includes a conveyor assembly 32 carried by a series of upright box frames 34 spaced along the length of the conveyor. An elongated centrally disposed box member 36 (FIG. 1) extends between the endmost frames 34a and 34b respectively and joins the remainder of the box frames 34. Box member 36 is centrally located between the upright side margins of frame members 34 and connected to the inwardly extending, horizontal upper sections of such frame members.

End support and shielding panel assembly 38 at the left hand end of apparatus as depicted in FIG. 1 houses a pair of horizontally spaced sprockets (not shown) which are rotatable about a horizontal axis. In like manner, a horizontal U-frame 40 at the right hand end of the conveyor assembly as shown in FIG. 1 supports a pair of horizontally spaced sprockets 42 in aligned relationship with the sprockets of assembly 38. A pair of endless chains 44 and 46 (FIGS. 2-5) are trained over and extend between corresponding sprockets at opposite ends of the assembly 32. Box member 36 is therefore midway between the upper and lower horizontal stretches of endless chains 44 and 46.

A series of poultry carcass supporting cones 48 are carried by chains 44 and 46 for movement therewith. As is apparent from FIG. 3, each cone 48 is pivotally carried by an apertured support plate 50 extending between and secured to opposed stretches of chains 44 and 46 by opposed L-shaped tabs 52. Cones 48 are swingable in corresponding apertures 50a of plates 50 by virtue of pivot pins 54 carried by opposed halves 52 and bolted to each plate 50. The upper segment 48a of each cone 48 is of substantially conical shape and configured to generally complementally fit within the rib cavity of a poultry carcass from which the legs and thighs have been removed. The tail segments 48b of each support cone 48 project through a respective aperture 50a of corresponding plates 50 as shown in FIGS. 2-5. Separator plates 51 are mounted on chains 44 and 46 between adjacent cone bearing plates 50.

Box member 36 also carries a number of upright, horizontally spaced H-shaped chain guide supports 56 which mount respective elongated chain engaging guide members 58 and 60 receiving the upper and lower stretches of chain 44, and guide members 62 and 64 receiving corresponding stretches of chain 46. A pair of elongated, horizontal chain stretch protecting members 66 are mounted on the upper edges of supports 56 in spanning relationship thereto and disposed outboard of the top stretches of chains 44 and 46.

Figure 4:
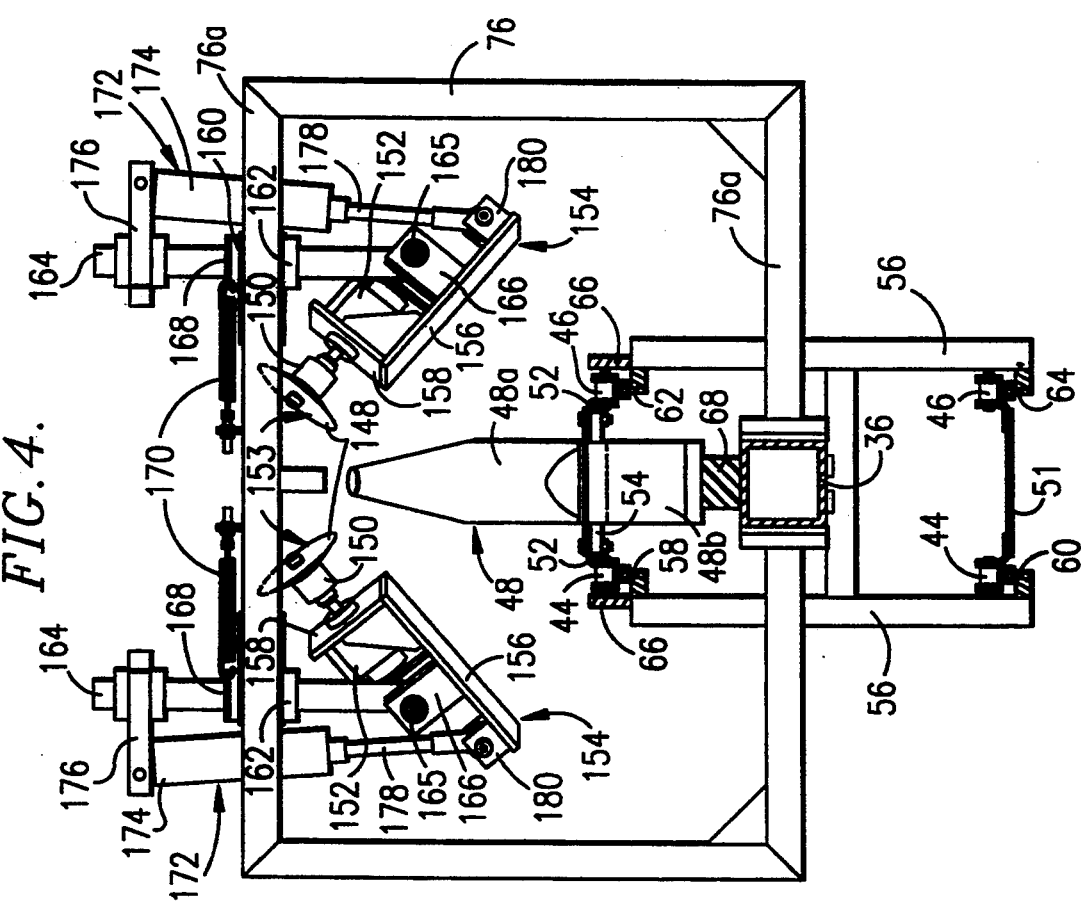
FIG. 4 is vertical cross-sectional view along a line at the right hand side of FIG. 2 and looking toward the left of that view.

Viewing FIGS. 2, 4 and 5, it is also to be seen that the pivot axis for each cone 48 defined by corresponding pins 52, is located toward the front margin of each bearing plate 50 in the direction of travel of cones 48. Thus, cones 48 may swing from the upright positions thereof illustrated on the left and right hand sides of FIG. 2 into angular positions indicated by the two intermediate cones 48 of that same FIG. Means for effecting tilting of cones 48 as they travel along the upper stretches of chains 44 and 46 may conveniently take the form of an elongated cam bar 68 resting on the top of box member 46 (see also FIGS. 1, 4 and 5). The bar 68 causes respective cones 48 to be tilted from the vertical through an angle of about 25°–30° and nominally about 27.5° along a portion of the path of travel of each cone and as defined by the length of the bar 68.

An assembly 70 (FIGS. 1–5) and constituting the principal subject matter of this invention is mounted on conveyor 32 on the left hand side of the apparatus as best shown in FIG. 1, for separating the shoulder-wing joints and for severing connective shoulder muscle and tendons of a poultry carcass being processed, and for forming incisions on opposite sides of the back of the breast meat the bird rib cage. Assembly 70 facilitates subsequent removal of the wings and breast meat from the carcass by a deboner unit designated 72 also mounted on the conveyor 32 downstream of assembly 70. Assembly 70 is preferably designed such that it may be mounted on conveyor 32 as a retrofit for an existing combination of conveyor 32 and processing unit 72, or assembly 70 may be included in the apparatus 30 at the time of initial fabrication thereof.

As best shown in FIGS. 2–5, assembly 70 is made up of two upright, horizontally spaced front and rear box frames 74 and 76 having lower cross leg portions 74a and 76a joined to and supported by box member 36. Three box members 78, 80 and 82 interconnect the upper horizontal legs 74a and 76a of box frames 74 and 76 in spanning relationship thereto.

Shoulder-wing joint locating, separating and severing means broadly designated 84 and constituting a joint cutter is carried by the cross member 80 adjacent box frame 74 at a first cutting station of assembly 70. Joint cutter 84 includes a block 86 mounted on the top of cross bar 80 adjacent horizontal legs 74a and 76a in disposition to support an upright, cylinder mounting support 90. A clevis 92 carried by the upper extremity of support 90 pivotally receives the cylinder end 94 of a piston and cylinder assembly 96. Another block 98 supported between the upper margins of side plates 104 and 106 is carried by the upper surface of cross bar 80 and spaced rearwardly from block 86 mounts an upright clevis 100 which pivotally receives the piston end 102 of assembly 96.

A pair of upright, horizontally spaced, triangular side plates 104 and 106 on opposite sides of box member 80 are pivotally mounted on block 86 for rotation about a pivot axis defined by mounting pin assembly 108 which extends through block 86. It can best be seen from FIGS. 2, 3 and 7 that pivot pin assembly 108 extends through side plates 104 and 106 at points adjacent the forwardmost portions of the plates. Accordingly, plates 104 and 106 are free to pivot about the horizontal axis of pin assembly 108 through displacements on opposite sides of box member 80.

An upright, generally planer joint locating, displacement and scissors blade defining plate member 110 is secured to the outer rearwardmost portion of side plate 104 in depending relationship thereto, while a similar plate member 112 is mounted on the opposite side plate 106 in horizontal aligned relationship with plate member 110. Each of the plate members 110 and 112 has an integral forwardly extending foot portion 110a, 112a respectively. It is evident from FIGS. 7 and 9 for example, that the forward edge of plate member 112 has a beveled forward edge 112b and that foot portion 112a also has a forward beveled edge 112c which merges with beveled edge 112b of plate member 112. Viewing FIG. 9, it can be observed that the beveled edges 112b and 112c are on the side of member 112 facing away from plate member 110. In like manner, plate 110 has beveled forward edge portions similar to beveled edge portions 110b and 110c and which are located on the side of member 110 facing away from plate member 112. The surfaces presenting the beveled edges of members 110 and 112 are at an angle of about 20°–40° and preferably about 30° with respect to the plane of the members. Also noteworthy is the fact that the dimensions of the parallelogram configured foot extension 110a of plate member 110, and the like configured, beveled leading edge foot extension of plate member 112 are such that during processing of poultry carcasses with apparatus 30, the shoulder-wing joint of the carcass will engage the beveled forward edges of members 110 and 112 with the shoulder joint nesting in the zone of merger between beveled surfaces 112b and 112c and like beveled surfaces of plate 110. The members 110 and 112 are secured to respective side plates 104 and 106 by bolt means 114 so that the plate members 110 and 112 may be replaced as desired to maintain the edge sharpness of edges 110b, 110c.

C-shaped cutter elements generally designated 116 and 118 are pivotally mounted on corresponding plate members 110 and 112 through respective pivot bolts 120. As best depicted in FIGS. 2, 6, 9 and 10, each of the cutter elements 116 and 118 has a planar body portion 122 pivotally carried by a section of a respective plate member 110 and 112 which depends from a corresponding side plate 104 or 106, as well as a lower C-shaped cutter portion 124. As shown in FIGS. 6 and 10, C-shaped cutter portion 124 of each of the cutter elements 116 and 118 has a beveled leading edge 124a, with the bevel being oriented oppositely from the beveled leading edges of a respective plate member 110 and 112. The angularity of the bevel of leading edges 124a is about 20–40° and preferably about 30°. The plate members 110 and 112 and their associated cutter elements 116 or 118 define scissors mechanisms which are operable to locate the shoulder-wing joints of a poultry carcass, displace the wing bones from respective shoulder sockets and sever connective shoulder muscle and tendons at the joints.

Means for rotating each of the cutter elements 116 and 118 through an arcuate path to effect separation of the shoulder-wing joints and to sever connective shoulder muscle and tendons of a poultry carcass, preferably takes the form of a pair of cooperatively operable piston and cylinder assemblies. Alternatively, other equivalent power means may be substituted for the fluid operated piston and cylinder assemblies. It can be seen in FIGS. 2, 3, 5, 8, 11 and 14 that piston and cylinder assemblies 126 and 128 are connected to cutter elements 116 and 118 respectively. The cylinder portion 130 of each assembly 126 and 128 is pivotally supported by brackets 132 connected to the ends of side plates 104 and 106 adjacent the axis of pivot pin assembly 108. The outer ends of rod portions 134 of assemblies 126 and 128 are pivotally secured to clevises 136 bolted to corresponding cutter elements 116 and 118. The arrangement is such that when rod portions 134 of piston and cylinder assemblies 126 and 128 are fully extended as shown in FIG. 2, the C-shaped cutter portions of cutter elements 116 and 118 are in their retracted positions with the scissors opening defined by respective C-shaped cutter portions 124 and plate members 110 and 112 completely open and unrestricted. Upon retraction of the rod portions of piston and cylinder assemblies 126 and 128, C-shaped cutter portions 124 are shifted through their cutting arcs to the disposition thereof best shown in FIG. 10.

L-shaped transverse shoulder cut knives 138 and 140 (see FIGS. 6, 8–11) are mounted on the cutter elements 116 and 118. Knives 138 and 140 have major legs 138a and 140a respectively secured to a corresponding plate member 110 and 112, and transverse, polygonal sharpened leading edge blade portions 138b and 140b projecting from a respective leg portion 138a or 140a. Referring to FIGS. 5, 8, 11, 14, 17 and 18, it can be observed that the L-shaped knives 138 and 140 are mounted such that the blade portions 138b and 140b overlie the edges of respective C-shaped cutter portions 124 of cutter elements 116 and 118 remote from the beveled edges 124a. Furthermore, the lower edges 138c and 140c of each knife 138 and 140 are sharpened as is evident for example, in FIG. 17.

Rotary blade cutter assemblies 144 and 146 (FIGS. 1–4 and 19) carried by box members 78 and 80 respectively at a second cutting station of assembly 70 downstream of joint cutter 84 are in proximal relationship to box frame 76. As is evident from FIG. 3, blade cutters 144 and 146 are in facing relationship to one another and are each provided with a rotary blade 148 secured to the drive shaft unit 150 of a drive motor 152 mounted on a respective carrier 154. The blades 148 are preferably constructed of an acetal synthetic resin material such as Celcon or the like, and have a beveled edge which faces inwardly toward the drive motor thereof. The cutter blades, which nominally may be about 3½ inches in diameter have a beveled outer edge which is approximately ⅜ inches in width and beveled at an angle of from about 20°–30° and preferably about 26.5°. Each carrier 154 has a main platform 156 provided with an upstanding wall 158 at the innermost end thereof which, in cooperative relationship with associated gussets and box structure receive and support respective motors 152 and drive shaft units 150. The cutter blade 148, drive shaft unit 150 and drive motor 152 of each rotary blade cutter 144 and 146 cooperatively define a blade assembly 153.

Mounting plate structures 160 carried by each of the box members 78 and 82 thereabove and therebelow and projecting outwardly from the box members adjacent box frame 76 support bearing means 162 receiving respective upright shafts 164 which are freely rotatable in corresponding bearings 162 but are not free to reciprocate therein. The lower end of each shaft 164 is received between and pivotally connected by a pivot pin 165 to a pair of upright, horizontally spaced plates 166 connected to and extending upwardly from the upper face of a respective platform 156 intermediate corresponding ends thereof. Thus, each carrier 154 and the cutter assembly 153 made up of motor 152, drive shaft unit 150 and drive 148 mounted thereon, is free to rotate about the axis of a respective shaft 164. A lever arm 168 secured to each shaft 164 directly above bearing means 162 supporting a respective shaft, projects rearwardly toward the adjacent box frame 76. Springs 170 secured to the outer extremities of respective lever arms 168 and also connected to box frame 76 in a manner as shown in FIGS. 3 and 4, normally maintain the rotary cutter assemblies 153 in the positions thereof illustrated in FIG. 3, but allow swinging movement of such cutter assemblies about the axes 164 against the bias of respective springs.

A piston and cylinder assembly 172 is also provided on each rotary blade cutter 144 and 146 for rotating each platform 154 and assemblies 153 thereof about the axes of pivotal connection of carriers 154 to respective shafts 162. Each piston and cylinder assembly 172 has a cylinder portion 174 pivotally secured to and depending from mounting structure 176 carried by the upper end of each shaft 164 and pivotal therewith. The rod portions 178 of each piston and cylinder assembly 172 is pivotally connected to coupling structure 180 mounted on the upper extremities of platforms 156 remote from respective rotary cutter assemblies 153. In the extended positions of rods 178 of piston and cylinder assemblies 172, the rotary cutter assemblies 153 are in the upper angular positions thereof as shown in FIGS. 4 and 19; however upon retraction of the rods 178, the rotary cutter assemblies 153 are pivoted about respective pivot axes 165 to bring cutter assemblies 153 into the lower positions thereof as showed by the dotted lines of FIG. 19.

A drive motor unit 182 is illustrated in FIG. 1 as being operably connected to conveyor assembly 32 at the right hand extremity thereof as shown in that illustration. In order to control sequential movement of the conveyor 32 by the unit 182 and to control actuation of the joint cutter 84 and rotary cutters 144 and 146, a conveyor control system schematically indicated by the box diagram 184 is operatively connected to a pair of cooperative optical beam and sensor units 184 and 186 located on opposite sides of the conveyor track adjacent joint cutter 84. Although a photoelectric sensor provides the required signal for stopping the conveyor when a cone reaches the first cutting station, a proximity switch could also be used to monitor the approach of a cone to the cutting station. When a photoelectric sensor is employed, the light beam generated by one of the optical units 186, 188 and sensed by the other unit is interrupted by a cone 48, thereby discontinuing operation of motor unit 182 for a predetermined period of time under the control of unit 184. The horizontal spacing between joint 84 relative to rotary blade cutters 144 and 146 is such that when a cone 48 is caused to pause at the first cutting station of the conveyor 32, the cone 48 immediately downstream therefrom is likewise strategically positioned relative to blade cutters 144 and 146.

A pair of horizontal, elongated rods 190 and 192 are supported above conveyor stretches 44 and 46 by supports 194. The rods 190 and 192 are located to underlie the wings of poultry carcasses carried by cones 48 and to stabilize the wings while they are being separated and severed. It can be seen in FIG. 5 that the supports 194 are secured to and extend upwardly from horizontal members 66 and are of longitudinally dogleg configuration so as to position rods 190 and 192 directly beneath joint cutter 84. The vertical positions of the rods 190 and 192 is such that wings hold and thereby are raised from the vertical about 15°–40° and preferably about 30°. Viewing FIGS. 2 and 12–16, it can also be seen that rods 190 and 192 terminate ahead of the second cutting position of assembly 70 midway between box frames 74 and 76.

The wing and breast removal unit 72 associated with conveyor 32 may be of conventional construction and thereby has opposed, irregularly configured, elongated wing receiving tracks 196 which receive respective wings of the carcass and ultimately remove the wings from the carcass as the wings are forced to move upwardly in the angularly disposed portions 196a of tracks 196. The unit 72 may also have conventional mechanism for removing breast meat from the carcass.

OPERATION OF THE FIRST DESCRIBED EMBODIMENT OF THE INVENTION

In the normal operation of apparatus 30 as depicted in FIG. 1, a hopper containing eviscerated poultry carcasses from which the thighs and legs have been previously removed, is drawn up to the front end, i.e., the left hand side of the apparatus as shown in FIG. 1, so that the carcasses may be individually positioned on cones 48 as the latter are brought into loading position.

Birds of varying weight may be processed with apparatus 30, although generally speaking, the carcasses will vary from about 2–5 lbs. In most instances, the carcasses in the supply hopper will have been sorted so that the weight range does not vary more than about 1 lb. from bird to bird for each processing run.

Alternatively, the previously processed carcasses may be unloaded from cones on another processing conveyor and transferred to the cones 48 of apparatus 30.

In FIG. 1, the cone 48' at the leftmost end of the FIG. is the cone which is next loaded with a carcass to be further processed. In order to load such cone, the operator places the bird on the cone with the breast facing rearwardly or to the left of the machine and the wings are draped over the strategically positioned rods 190 and 192. Thus, the back of the bird faces toward the right in a position toward the joint cutter 84. Cones 48 also desirably have a groove in the front faces thereof which complementally receive the backbone of the carcass to assist in stabilizing the rib cage of the carcass against rotation during further processing of the carcass.

Continued movement of the chains 44 and 46 of conveyor 32 brings the next cone 48" into a position for loading of a carcass thereon in the same manner in the way in which cone 48' was loaded. Sequential loading of cones 48 is carried out in the manner as described.

When a cone 48 leaves a first cutter station of assembly 70 defined by joint cutter 84 as well as by the optical sensing means 186, 188, the cone 48 with a poultry carcass thereon next upstream from such first cutting station continues to move toward the joint cutter 84 until the light beam between opposed optical sensors 186, 188 is broken by the cone. This discontinues operation of the motor drive unit 182 for a predetermined period of time as previously described.

Referring to FIGS. 12–16 which schematically depict the way in which the shoulder joints of a carcass are separated and partially severed by locating, separating and severing means 84, the cone 48''' supports poultry carcass 200 in disposition such that the breast 200a faces upstream of the conveyor, wings 200b are draped over respective rods 190 and 192, the neck portion is thrust upwardly, and the back 200c of the carcass faces forwardly or downstream of the assembly. It is to be noted in these FIGS. that the cone 48''' has been tilted somewhat from its initial upright position by virtue of engagement of the tail portion 48b of such cone with the ramp of cam bar 68. During movement of the carcass 200 and cone 48''' toward joint cutter 84.

At this juncture in the operating sequence of the apparatus, rod 102 of piston and cylinder assembly 96 is extended so that the members 110 and 112 are in the positions thereof illustrated in FIGS. 2 and 12–15. The shoulder joints defined by the wing bones and shoulder sockets of the bird move toward plate members 110 and 112 until the joints engage the beveled cutting edges 110b, 110c, 112b and 112c of such members. The beveled edges serve to search out respective shoulder joints and ultimately become nested in respective joint notches 202 of the carcass defined by the zones of merger of wing bones 204 with corresponding shoulder sockets 206 (FIG. 18). Foot extensions 110a and 112a of the plate members 110 and 112 move into partial supporting relationship to the wing-shoulder joints of the carcass, as well as into nesting relationship with the wing bone-shoulder sockets to assure that the scissors cutting mechanism defined by plate members 110 and 112 and respective cutter elements 116 and 118, are correctly aligned with the joints.

At this time, movement of the conveyor ceases and the control system 184 causes rods 134 of piston and cylinder assemblies 126 and 128 to be retracted thus rotating cutter elements 116 and 118 about a respective pivot axes whereby C-shaped cutter portions 124 of cutter elements 116 and 118 cooperate with associated plate members 110 and 112 to initially displace the wing bones 204 of the carcass from their shoulder sockets 206, and to then sever the upper and lower tendons 208 and 210 of respective shoulder joints. The scissors mechanisms defined by plate members 110 and 112 and respective cutter elements 116 and 118 sever connective shoulder muscle and tendons of the carcass, but do not cut away all of the cartilage and flesh attaching the wings to the carcass which would cause the wings to be completely severed from the bird.

Instead, the locating, separating and severing means 84 functions to sever the wings from the carcass to an extent that the wings hang loosely from the carcass and may be readily pulled therefrom as the wings subsequently move along and then upwardly in track 196 of unit 72.

The mutually cooperable beveled edges of members 110 and 112 as well as C-shaped sections 124 of elements 116 and 118 not only inincision the effectiveness of the scissors cutting action but also serve to initially push the wing bones 204 away from their respective shoulder sockets 206 so that the cutting edges sever only flesh and tendons, and do not cut through the bone structure of the carcass.

The extent of lifting of the wings of the carcass by the rods 190, 192 is also important to effectively hold each of the shoulder joints open to an extent that the scissors mechanism will effectively cut through the shoulder muscle and tendons without severing bone. As previously indicated, a wing lift of from about 15°–45° from vertical is desirable with 30° being preferred.

As shown by FIGS. 14 and 18, during actuation of the scissors mechanism defined by members 110 and 112 as well as elements 116 and 118, the transverse cutter knives 138 and 140 carried by elements 116 and 118 move therewith through a displacement to cause the sharpened edges 138c and 140c of knives 138 and 140 to form short transverse cuts in the flesh of the bird immediately above respective shoulder joints. These short transverse cuts are necessary to facilitate subsequent removal of the breast meat from the carcass in deboner 72.

Retraction of the cutter elements 116 and 118 by extension of rods 134 of piston and cylinder assemblies 126 and 128 and associated retraction of rod 102 of piston and cylinder assembly 96 to pivot triangular side plates 104 and 106 about pivot axis 108 thereby lifting members 110 and 112 to the positions thereof illustrated in FIG. 16, allows the carcass 200 on cone 48''' to be moved toward the cutter assemblies 153. When the wings fall from the ends of support rods 190 and 192, the wings then hang loosely from the carcass as shown in FIG. 16, remaining connected only by residual flesh and some cartilage.

As previously indicated, the position of cone 48''' at the second cutting station of assembly 70 is determined by interruption of the movement of the cone 48 next upstream which breaks the light beam between sensors 186, 188 to again actuate control system 184.

At the second cutting position defined by rotary blade cutters 144 and 146, piston and cylinder assemblies 172 are actuated to tilt carriers 154 about a respective axis 165. Drive motors 152 are preferably operated continuously so that the blades 148 are always rotating at constant speed. During tilting of carriers 154, the blades 148 engage the carcass supported by the adjacent cone 48 causing the edges of the blades 148 to form an incision in the breast meat adjacent the back of the rib cage and to form opposed, elongated arcuate incisions 212 and 214 (FIG. 19) in the breast meat as the blades 148 move downwardly along the backbone of the bird. By virtue of the fact that the blades 148 are formed of a synthetic resin material, the sharp cutting edges thereof do not sever or cut through the bone structure of the carcass. For example, poultry carcasses have an angularly located bone which serves as partial support for a respective shoulder socket and that extends from the socket down toward the rib cage. Blades 148 contact these angularly disposed joint supporting bones and follow along such bones without severing the same. This results in somewhat arcuate incisions being formed in the breast flesh of the carcass on opposite sides of the backbone structure. The elongated incisions 212 and 214 thereby formed accurately mimic previously hand formed cuts made in the carcasses and enhance removal of a complete butterfly shaped breast meat filet from the carcass by deboner 72 or other similar processing apparatus.

Mounting of the cutter assemblies 153 on carriers 154 which may freely rotate about the vertical axes of shaft 164 against the bias of springs 170 permits cutter assemblies 153 to pivot as necessary so that the cutter blades follow along the bone structure of the carcass including the angularly disposed shoulder joint supporting bones described above without cutting through or fragmenting such bones. It can therefore be seen, that as the carriers 154 and thus the cutter assemblies 153 mounted thereon, rotate about axes 165 during downward movement of cutter blade 148, the assemblies 153 may also pivot about vertical axes defined by shafts 164 to an extent as may be required by deflection of cutter blades 148 as they engage and ride along corresponding, angularly disposed shoulder joint supporting bones of the carcass. Furthermore, the path of rotation of carriers 154 and thereby cutter assemblies 153 is sufficient to allow cutter blades 148 to form upright incisions in the back portions of the carcass breast which extend substantially the full length of the breast meat. The beveled edges of cutters 148 enhance this function and assure that the blade follow but do not cut through the joint support bones of the carcass.

As soon as the cutter assemblies 153 reach the lower end of their path of travel, piston and cylinder assemblies 172 are operated in a manner to retract the cutter assemblies 153 and return the same to the positions illustrated in FIG. 4.

The cycle of operation of assembly 7 is then repeated to bring the next upstream carcass supporting cones 48 into the first and second cutting stations defined by locating, separating and severing means 84 and rotary blade cutters 144 and 146 respectively.

Note should also be taken of the fact that the horizontal spacing between plate members 110 and 112 should be within fairly narrow tolerances to assure that the beveled edges of the plate members 110 and 112 engage the shoulder joints of the poultry carcass with the joint being cradled in the zones of merger of beveled edges 110b and 110c and 112b and 112c respectively, so that opposed shoulder joints of the carcass will be trapped in the V defined by merging beveled surfaces of members 110 and 112 as C-shaped scissor defining cutter elements 116 and 118 are rotated through their cutting paths of travel. The actual spacing of such parts is governed by the size of the birds being processed and should be set up accordingly. Generally speaking, the distance between plates 110 and 112 should be maintained at tolerances varying no more than about ⅛ inch to 3/16 inch, and preferably in the range 1/16 inch to 1/32 inch from a pre-established value. In this manner, severing of the joints may be accomplished without undesirable cutting of bone or unwanted cartilage.

DESCRIPTION OF AN ALTERNATE PREFERRED EMBODIMENT OF THE INVENTION

FIG. 20 illustrates an alternate embodiment of the poultry processing apparatus of this invention, comprising a stand alone unit 230 having a conveyor 232, and a cutting assembly 270 which is for all practical purposes identical in construction and operation to assembly 70 heretofore described. The principle difference between apparatus 230 and previously described apparatus 30 is the fact that apparatus 230 is intended to be used for automatic shoulder joint separation and partial severance, formation of short transverse shoulder cuts, and cutting of long incisions in the breast meat adjacent the back of the carcass in order to prepare the birds for subsequent processing in a separate deboner such as the deboner 72 or the like.

It is contemplated that apparatus 230 be operated as a stand-alone unit wherein eviscerated birds having the thighs and legs removed are run through unit 230 and then placed back in a storage hopper. Thereafter, these preprocessed birds are placed on cones similar to these described and illustrated with respect to apparatus 30, for entry into a conventional deboner or other mechanism for removing the wings and breast meat.

Stand-alone apparatus 230 differs from previously described apparatus 30 in that the conveyor supports bird receiving cones which are mounted in an upright position and do not tilt as is the case with the cones of apparatus 30. An electric sensor such as the photoelectric sensing mechanism specifically illustrated in FIGS. 1-3 inclusive is not necessary for the stand-alone unit for the purpose of stopping the conveyor. Accordingly, an electronic sensor operatively connected to a proximity switch may be employed to initiate the piston and cylinders and air motor actuation.

Another, although immaterial difference between apparatus 30 and stand-alone apparatus 230 is the fact that subsidiary wing guide bar structure 390 is provided at the outlet end of the conveyor 232 for holding the wings of the birds as they emerge from the rotary cutters at the second cutting station of the mechanism.

In view of the duplicity of parts, it is not deemed necessary to repeat the description thereupon a part by part basis. However, for clarity a number parts of apparatus 230 illustrated in FIG. 20 which are essentially the same as the parts of apparatus 30 depicted in FIGS. 1-19, have been numbered using the number series 200 and 300 but using the same number sequence, e.g., conveyor 32 in FIGS. 1-19 and conveyor 232 in FIG. 20 and guide rods 190 in FIGS. 1-19 and 390 in FIG. 20, etc.

I claim:

1. In a poultry processing apparatus for separating the shoulder-wing joints and for severing connective shoulder muscle and tendons of a poultry carcass being processed to facilitate subsequent removal of the wings and breast meat from the carcass, the improvement which comprises:
   a means for supporting the carcass in accessible disposition for separation and severing of each shoulder-wing joint made up of a wing bone and a shoulder socket joined by connective tendons and shoulder muscle;
   shoulder-wing joint locating and separating means on each side of the carcass supporting means,
   each of said joint locating and separating means including an upright member having an edge positioned to engage the carcass in general nesting relationship to the notch where a respective wing bone is received in a corresponding shoulder socket, and an extension foot means projecting from said edge of a respective member and cooperable with said edge to define a wing-shoulder joint receiving indentation; and
   a cutter means operably associated with each of said locating and separating members,
   each of said cutter means being shiftable through a displacement path from an initial position on the side of a respective wing-shoulder joint of the carcass remote from the locating and separating member, toward and past the edge of the said member to cooperate with the latter in displacing a respective wing joint from its shoulder receiving socket and to sever the connective shoulder muscle and tendons of the shoulder-wing joint thereby effecting partial separation of a corresponding wing from the carcass for facilitating said subsequent removal of the breast meat and wings from the carcass rib cage.

2. Apparatus as set forth in claim 1, wherein said edge of each of the locating and separating members has a beveled portion to enhance entry thereof into a respective shoulder-wing joint for displacement of the wing bone from its shoulder socket as a corresponding cutter means is shifted from said initial position thereof past said edge of a respective member.

3. Apparatus as set forth in claim 1, wherein said extension of the each member also has a beveled surface on the same side of the member as said beveled edge portion thereof.

4. In a poultry processing apparatus for separating the shoulder-wing joints and for severing connective shoulder muscle and tendons of a poultry carcass being processed to facilitate subsequent removal of the wings and breast meat from the carcass, the improvement which comprises:
   a means for supporting the carcass in accessible disposition for separation and severing of each shoulder-wing joint made up of a wing bone and a shoulder socket joined by connective tendons and shoulder muscle;
   shoulder-wing joint locating and separating means on each side of the carcass supporting means,
   each of said joint locating and separating means including an upright member having an edge positioned to engage the carcass in general nesting relationship to the notch where a respective wing bone is received in a corresponding shoulder socket, and
   a cutter means operably associated with each of said locating and separating members,
   each of said cutter means including a C-shaped cutter element presenting a leading cutting edge cooperable with said edge of a respective member to define therewith scissors mechanism for displacing the wing bone from a respective shoulder socket and to sever the connective shoulder muscle and tendons of the corresponding shoulder-wing joint of the carcass,
   each of said cutter means being shiftable through a displacement path from an initial position on the side of a respective wing-shoulder joint of the carcass remote from the locating and separating member, toward and past the edge of the said member to cooperate with the latter in displacing a respective wing joint from its shoulder receiving socket and to sever the connective shoulder muscle and tendons of the shoulder-wing joint thereby effecting partial Separation of a corresponding wing from the carcass for facilitating said subsequent removal of the breast meat and wings from the carcass rib cage.

5. Apparatus as set forth in claim 4, wherein said locating and separating members are mounted in fixed dispositions and said C-shaped cutter elements are mounted for rotational movement with respect to a corresponding locating and separating member.

6. Apparatus as set forth in claim 5, wherein each of said C-shaped cutter elements are mounted on and rotatably carried by corresponding locating and separating members.

7. Apparatus as set forth in claim 4, wherein said edge of each of the locating and separating members has a beveled portion to enhance entry thereof into a respective shoulder-wing joint, said C-shaped cutter element of each cutter means being provided with a beveled leading edge, the bevel of said edge of the member and the bevel of the cutter element being oriented in opposite directions away from each other to enhance separation of a corresponding wing bone from its shoulder socket and to facilitate severing of the connective shoulder muscle and tendons of the wing-shoulder joint.

8. Apparatus as set forth in claim 4, wherein is provided knife means extending transversely of the displacement path of the cutter means and located to cut the breast meat of the carcass immediately above each of the shoulder-wing joints and thereby enhance subsequent removal of the wings and breast meat from the carcass.

9. Apparatus as set forth in claim 8, wherein is provided knife means for each of said cutter means, each of said knife means being mounted on a respective cutter means for shifting movement therewith.

10. In a poultry processing apparatus for separating the shoulder-wing joints and for severing connective shoulder muscle and tendons of a poultry carcass being processed to facilitate subsequent removal of the wings and breast meat from the carcass, the improvement which comprises:

- a means for supporting the carcass in accessible disposition for separation and severing of each shoulder-wing joint made up of a wing bone and a shoulder socket joined by connective tendons and shoulder muscle;
- a conveyor means for conveying the carcass supporting means with the carcass thereon along a path of travel;
- a pair of shoulder-wing joint locating and separating means generally aligned with one another on opposite sides of said path of travel for engaging respective shoulder-wing joints of the carcass in nested relationship to said notch between a respective wing bone and its corresponding wing bone socket as the carcass carried by the supporting means therefor is conveyed toward the separation means by the conveyor means.
- each of said joint locating and separating means including an upright member having an edge positioned to engage the carcass in general nesting relationship to the notch where a respective wing bone is received in a corresponding shoulder socket;
- a cutter means operably associated with each of said locating and separating members,
- each of said cutter means being shiftable through a displacement path from an initial position on the side of a respective wing-shoulder joint of the carcass remote from the locating and separating member, toward and past the edge of the said member to cooperate with the latter in displacing a respective wing joint from its shoulder receiving socket and to sever the connective shoulder muscle and tendons of the shoulder-wing joint thereby effecting partial separation of a corresponding wing from the carcass for facilitating said subsequent removal of the breast meat and wings from the carcass rib cage; and
- a means for effecting movement of the conveyor means carrying the carcass supporting means thereon, in one direction along said path of travel of the conveyor means, and a means for interrupting movement of the carcass supporting means along the path of the conveyor means after a corresponding locating and separating means has been received in a respective notch defining shoulder-wing joint of the carcass.

11. Apparatus as set forth in claim 10, wherein is provided means for actuating each of said cutter means to shift the latter through respective paths of displacement thereof to separate corresponding wing-shoulder joints and sever connective shoulder muscle and tendons of the joint after a respective locating and separating member has been received in a corresponding notch defining shoulder-wing joint of the carcass.

12. Apparatus as set forth in claim 10, wherein is provided means on each side of the path of travel of the conveyor means for engaging the wings on opposite sides of the carcass to elevate the wings and thus facilitate entry of the locating and severing means into the shoulder-wing joints of the carcass.

13. Apparatus as set forth in claim 12, wherein said wing elevation means comprises a pair of generally horizontal rods extending along the path of travel of the conveyor means in substantially parallel relationship thereto.

14. In poultry processing apparatus for separating the shoulder-wing joints and for severing connective shoulder muscle and tendons of a poultry carcass being processed and for forming incisions on opposite sides of the breast meat on the bird rib cage to facilitate subsequent removal of the wings and breast meat from the carcass, the improvement which comprises:

- means for supporting the carcass in accessible disposition for separation and severing of each shoulder-wing joint made up of a wing bone and a shoulder socket joined by connective tendons and shoulder muscle;
- shoulder-wing joint locating and separating means on each side of the carcass supporting means.
- each of said joint locating and separating means including an upright member having an edge positioned to engage the carcass in general nesting relationship to the notch where a respective wing bone is received in corresponding shoulder socket; and
- cutter means operably associated with each of said locating and separating members,
- each of said cutter means being shiftable through a displacement path from an initial position on the side of a respective wing-shoulder joint of the carcass remote from the locating and separating member, toward and past the edge of the said member to cooperate with the latter in displacing a respective wing joint from its shoulder receiving socket and to sever the connective shoulder muscle and tendons of the shoulder-wing joint and thus effect partial separation of each wing from the carcass; and
- blade means moveable through a path of travel to form an incision in the breast meat on each side of the carcass rib cage extending from a point adjacent a respective shoulder joint to a position remote from such joint and of a length to define incision lines on opposite sides of the carcass for facilitating said subsequent removal of the breast meat and wings from the carcass rib cage,
- said blade means including a rotatable blade on each side of the carcass, a drive means for rotating each blade, and a carrier means for said drive means for moving a respective blade means downwardly to form incisions in the breast meat on opposite sides of the carcass, said carrier means being operable to allow a corresponding blade and the drive means therefor to pivot about an upright axis as respective rotating blades are moved downwardly, each of said carrier means being pivotal through an arc about a corresponding upright axis sufficient to permit each blade to be laterally deflected as it engages angularly positioned bone structure on the carcass so that each blade will closely follow along the line of the adjacent carcass bone structure.

15. Apparatus as set forth in claim 14, wherein is included conveyor means for the carcass supporting means operable to convey the supporting means with the carcass thereon along a path of travel, said locating and separating means and the cutter means being located along said path of travel in disposition to move between corresponding wing bones and shoulder sockets receiving such bones and to thereafter sever corresponding connective shoulder muscle and tendons of a shoulder-wing joint when the carcass support means is in one position along said path of travel, and the blade drive means and blades driven thereby being located in disposition to form said incisions in opposite sides of the breast meat of the carcass when the carcass support means is in a second position along said path of travel spaced from said one position along said path.

16. Apparatus as set forth in claim 15, wherein is provided sensing and timing means along said path of travel for sensing movement of the carcass support means to interrupt such movement when the carcass support means reaches said one position for a time period to allow shoulder joint separation and severing of said connective muscle and tendons of said shoulder-wing joints at said one position, and for thereafter again interrupting movement of said carcass support means when the latter reaches said second position for a time period to allow formation of said incisions in the breast meat of the carcass by said blade means.

17. Apparatus as set forth in claim 16, wherein said carrier means includes platform means supporting each drive means and the blade thereon in disposition with respective blade facing towards the carcass support while the latter is in said second position thereof, power means for swinging each platform means about an essentially horizontal axis to move the blade of a corresponding blade means through an arc to form a respective incision in the carcass breast meat, and upright shaft means rotatably mounting respective platform means for pivoting movement of the platform means through an arc sufficient to allow deflection of a corresponding blade as it engages said angled bone structure of the carcass while the latter is at said second position.

18. In poultry processing apparatus for forming incisions on opposite sides of the breast meat on the bird rib cage of a poultry carcass to facilitate subsequent removal of the wings and breast meat from the carcass, the improvement which comprises:

means for supporting the carcass; and a blade means moveable through a path of travel to form an incision in the breast meat on each side of the carcass rib cage extending from a point adjacent a respective shoulder joint to a position remote from such joint and of a length to define incision lines on opposite sides of the carcass for facilitating said subsequent removal of the breast meat and wings from the carcass rib cage, the blade means including a rotatable blade on each side of the carcass, a drive means for rotating each blade, and a carrier means for said drive means for moving a respective blade means downwardly to form incisions in the breast meat on opposite sides of the carcass, the rotatable blades being formed of a synthetic resin material and including beveled outer cirumferential edges facing inwardly toward the drive means so that each blade may be laterally deflected as it engages angularly positioned bone structure on the carcass so that each blade will closely follow along the line of the adjacent carcass bone structure.

* * * * *